United States Patent
Klamklang et al.

(10) Patent No.: US 10,400,150 B2
(45) Date of Patent: Sep. 3, 2019

(54) HIGH EMISSIVITY COATING COMPOSITIONS AND MANUFACTURING PROCESSES THEREFORE

(71) Applicants: SCG CHEMICALS CO., LTD., Bangkok (TH); SIAM REFRACTORY INDUSTRY CO., LTD., Bangkok (TH)

(72) Inventors: Songsak Klamklang, Chainat (TH); Suntad Charukijpipat, Rayong (TH); Thanapong Prasertphol, Bangkok (TH); Chayin Chinkomolsuk, Bangkok (TH); Somkeat Suebthawilkul, Nonthaburi (TH); Chanvit Chawengkul, Saraburi (TH)

(73) Assignees: SCG CHEMICALS CO., LTD., Bangkok (TH); SIAM REFRACTORY INDUSTRY CO., LTD., Bangkok (TH)

( * ) Notice: Subject to any disclaimer, the term of this patent is extended or adjusted under 35 U.S.C. 154(b) by 0 days.

(21) Appl. No.: 15/421,241

(22) Filed: Jan. 31, 2017

(65) Prior Publication Data
US 2017/0137686 A1   May 18, 2017

Related U.S. Application Data

(62) Division of application No. 14/240,550, filed as application No. PCT/TH2012/000010 on Feb. 29, 2012, now Pat. No. 9,587,120.

(51) Int. Cl.
*C04B 35/10* (2006.01)
*C04B 35/46* (2006.01)
(Continued)

(52) U.S. Cl.
CPC ............. *C09K 5/14* (2013.01); *C01G 23/047* (2013.01); *C04B 35/10* (2013.01); *C04B 35/101* (2013.01);
(Continued)

(58) Field of Classification Search
None
See application file for complete search history.

(56) References Cited

U.S. PATENT DOCUMENTS

| | | | |
|---|---|---|---|
| 4,107,264 | A | 8/1978 | Nagasubramanian et al. |
| 4,168,297 | A | 9/1979 | Nagasubramanian et al. |

(Continued)

FOREIGN PATENT DOCUMENTS

| | | |
|---|---|---|
| JP | 2000/160218 A | 6/2000 |
| JP | 2005/139020 A | 6/2005 |

(Continued)

OTHER PUBLICATIONS

Eccles, P.J., "An Introduction to Mathematical Reasoning: Numbers, Sets, and Functions," Chapter 11: Properties of Finite Sets, Cambridge University Press (1998), 11 pages.

(Continued)

*Primary Examiner* — Colin W. Slifka
(74) *Attorney, Agent, or Firm* — Seed IP Law Group LLP

(57) ABSTRACT

Titanium dioxide is used as an emissivity enhancer in high emissivity coating compositions. The titanium dioxide increases the emissivity of the high emissivity coating compositions. In certain embodiments, titanium dioxide is recovered from industrial waste sources such as catalyst containing waste streams from olefin polymerization processes or re-based sources. Titanium dioxide emissivity enhancers recovered from industrial waste sources contribute favorably to the cost of manufacturing high emissivity coating compositions containing such enhancers.

16 Claims, 5 Drawing Sheets

(51) Int. Cl.
    *C04B 35/622*     (2006.01)
    *C04B 35/626*     (2006.01)
    *C09K 5/14*     (2006.01)
    *F27D 1/00*     (2006.01)
    *C09D 1/00*     (2006.01)
    *C01G 23/047*     (2006.01)
    *C04B 35/101*     (2006.01)
    *C04B 35/63*     (2006.01)
    *C04B 41/87*     (2006.01)
    *C04B 41/00*     (2006.01)
    *C04B 41/50*     (2006.01)
    *C09D 7/61*     (2018.01)
    *C08K 3/22*     (2006.01)

(52) U.S. Cl.
CPC .......... *C04B 35/1015* (2013.01); *C04B 35/46* (2013.01); *C04B 35/62222* (2013.01); *C04B 35/62625* (2013.01); *C04B 35/6306* (2013.01); *C04B 35/6316* (2013.01); *C04B 41/009* (2013.01); *C04B 41/5031* (2013.01); *C04B 41/87* (2013.01); *C09D 1/00* (2013.01); *C09D 7/61* (2018.01); *F27D 1/0006* (2013.01); *C04B 2235/3217* (2013.01); *C04B 2235/3232* (2013.01); *C04B 2235/3241* (2013.01); *C04B 2235/3418* (2013.01); *C04B 2235/3804* (2013.01); *C04B 2235/3817* (2013.01); *C04B 2235/3826* (2013.01); *C04B 2235/3852* (2013.01); *C04B 2235/5436* (2013.01); *C04B 2235/77* (2013.01); *C04B 2235/96* (2013.01); *C08K 2003/2241* (2013.01)

(56) References Cited

U.S. PATENT DOCUMENTS

| | | |
|---|---|---|
| 5,094,834 A | 3/1992 | Wiederhoft et al. |
| 5,668,072 A | 9/1997 | Holcombe, Jr. et al. |
| 6,120,883 A * | 9/2000 | Litman ................ H05K 3/0076 428/32.5 |
| 6,921,431 B2 | 7/2005 | Evans et al. |
| 8,460,516 B2 | 6/2013 | Kim |
| 9,011,791 B2 | 4/2015 | Olver et al. |

FOREIGN PATENT DOCUMENTS

| | | |
|---|---|---|
| KR | 2011/011973 A | 2/2011 |
| WO | 2004/063652 A2 | 7/2004 |
| WO | 2011/077447 A2 | 6/2011 |

OTHER PUBLICATIONS

Tran, H.K. et al., "Thermal Degradation Study of Silicon Carbide Threads Developed for Advanced Flexible Thermal Protection Systems," *NASA Technical Memorandum* 103952, Aug. 1992, 16 pages.

International Search Report, dated Feb. 8, 2013, for PCT/TH2012/000010, 1 page.

* cited by examiner

HIGH EMISSIVITY COATING COMPOSITIONS AND MANUFACTURING PROCESSES THEREFORE

BACKGROUND

Technical Field

The present disclosure relates generally to compositions for high emissivity coatings that can be applied to various types of substrates, and to processes for manufacturing high emissivity coating compositions. More particularly, the present disclosure relates to (1) high emissivity coating compositions with enhanced strength properties, (2) high emissivity coating compositions in which titanium dioxide ($TiO_2$) is used an emissivity enhancing agent; and (3) manufacturing processes for cost-effectively producing high emissivity coating compositions using an industrial waste source or stream.

Description of the Related Art

Increasing demand for energy and rising energy costs throughout the world have inevitably increased the need for energy users to save or conserve energy, particularly among industrial entities. In many instances, industries that use fired heaters or furnaces, such as refineries and petrochemical complexes, have attempted to maximize fired heater efficiency to thereby reduce fuel consumption. High emissivity coating technology has become a proven means for various high temperature applications to effectively increase radiant heat transfer and save energy without compromising process reliability and safe operation.

Emissivity (symbolically represented as c or e) can be broadly defined as the relative ability of a surface to emit energy by radiation. More particularly, emissivity can be defined as the ratio of energy radiated by a particular material to energy radiated by a blackbody at the same temperature. Higher emissivity corresponds to an increase in thermal efficiency. An increase in thermal efficiency attributed to high emissivity coatings in high temperature fired heater or furnace applications results in an increase in fired heater or furnace performance or output and/or a decrease in fuel consumption and overall energy demand.

The benefits and advantages of high emissivity coatings have led to various research and development efforts over the years to improve the performance of high emissivity coatings. In particular, research has been conducted to develop emissivity coating compositions that include emissivity enhancing agents ("emissivity agents") to a) enhance emissivity values in order to increase radiant heat transfer; b) improve coating adhesion on substrates; c) extend coating lifetime across multiple high temperature cycles; and d) reduce emissivity agent degradation.

Currently, several high emissivity coating compositions are commercially available. Emissivity agents in such compositions can be derived from various sources. One commonly used emissivity agent is silicon carbide (SiC), which can exhibit good emissivity enhancement performance up to moderate temperatures. However, the use of SiC as an emissivity agent in applications involving high operating temperatures (e.g., fire heater, furnace, preheater, reformer, other refractory applications, or aerospace applications) can lead to a substantial decrease in emissivity and mechanical strength of the coating composition over time, and hence an overall decrease or degradation in the performance or function of a coating composition relying upon SiC as an emissivity agent.

In NASA Technical Memorandum 130952, entitled "Thermal Degradation Study of Silicon Carbide Threads Developed for Advanced Flexible Thermal Protection Systems," published in August 1992, H. K. Tran and P. M. Sawko found that a surface transition of SiC to $SiO_2$ was observed at temperatures greater than 400° C. The surface transition of SiC to $SiO_2$ was due to temperature induced decomposition of SiC bonds and the subsequent formation of $SiO_2$. The decomposition reaction of SiC at high temperature can be illustrated as follows:

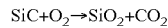

$$SiC + O_2 \rightarrow SiO_2 + CO_2$$

Such decomposition of SiC can undesirably result in significant material shrinkage, unintended $SiO_2$ passivation, and shorter coating composition lifetime. Accordingly, a need exists for improved emissivity agents for high emissivity coating compositions, particularly with respect to improving emissivity agent performance of emissivity coatings at high temperatures. Unfortunately, prior research on high emissivity coating compositions has failed to adequately consider or recognize that certain substances can potentially have a significant impact on enhancing emissivity values.

In addition to the foregoing, although aspects of high emissivity coating performance are being investigated and improved, existing processes for manufacturing high emissivity coating compositions fail to appropriately consider or address certain economic aspects of producing such compositions. In particular, while various efforts have been made to develop high emissivity coatings with better performance, such efforts have largely ignored or unavoidably increased the cost of producing such coating compositions and the end price of high emissivity coating products. Accordingly, there is a need for preparing, manufacturing, or formulating high emissivity coating compositions in a more cost-effective manner.

BRIEF SUMMARY

Embodiments of the subject matter described in this application are directed to thermal emissivity coatings that exhibit desirable mechanical strength properties and emissivity over a broad range of temperatures, (e.g., about 400° C. to about 1300° C. Unlike other emissivity coatings that exhibit cracking and delamination from substrates to which the coatings are applied, embodiments of the subject matter described herein survive repeated temperature cycles from room temperature to temperatures typically used in decoking cycles, e.g., about 1000° C. to about 1600° C. or higher, without cracking or delamination from underlying substrates. At the same time coating compositions in accordance with embodiments described herein exhibit desirable emissivity, e.g., as high as 0.99.

In one aspect, embodiments described herein are directed to thermal emissivity coatings that include a dry admixture of a set of emissivity agents including titanium dioxide, wherein a weight percentage of the titanium dioxide is less than approximately 28% by weight of the coating composition and at least approximately 10% by weight of the coating composition, and a set of matrix strength enhancers selected from at least one of ceramic borides, ceramic carbides, and ceramic nitrides. In some embodiments of this aspect of the described subject matter the coating includes less than 30 wt % SiC on a dry basis.

In another aspect, embodiments described herein are directed to methods of preparing thermal emissivity coating compositions for a substrate that include steps of obtaining titanium dioxide; providing a set of emissivity agents including the titanium dioxide; providing a set of matrix strength enhancers that includes at least one matrix strength enhancer selected from the group consisting of ceramic borides, ceramic carbides, and ceramic nitrides; providing a set of fillers, at least one filler selected from the group consisting of aluminum oxide, silicon dioxide, magnesium oxide, calcium oxide, and boron oxide; and combining the set of emissivity agents, the set of matrix strength enhancers, and the set of fillers, wherein the filler comprises about 2 wt % to about 60 wt % on a wet basis of the coating composition. In some embodiments of this aspect of the described subject matter SiC is provided such that the coating composition includes less than 30 wt % SiC on a dry basis.

In yet another aspect, disclosed embodiments are directed to methods for modifying thermal emissivity of a substrate using a thermal emissivity coating composition that includes steps of identifying a target emissivity level or a target emissivity modification; determining a coating composition titanium dioxide concentration expected to provide the target emissivity level or the target emissivity modification; determining a set of substrate adhesion properties for the coating composition; determining a coating composition SiC concentration expected to provide the determined set of substrate adhesion properties; and providing a thermal emissivity coating composition that includes the determined titanium dioxide concentration and the determined SiC concentration. In some embodiments of this aspect of the described subject matter, the determined SiC concentration is less than 30 wt % SiC on a dry basis.

In another aspect, the titanium dioxide used as an emissivity agent or enhancer is obtained from a titanium dioxide containing waste stream from a polyolefin polymerization process.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and they have been solely selected for ease of recognition in the drawings.

Embodiments of the present disclosure are described hereinafter with reference to the Figures, in which.

DETAILED DESCRIPTION

Figure 1:
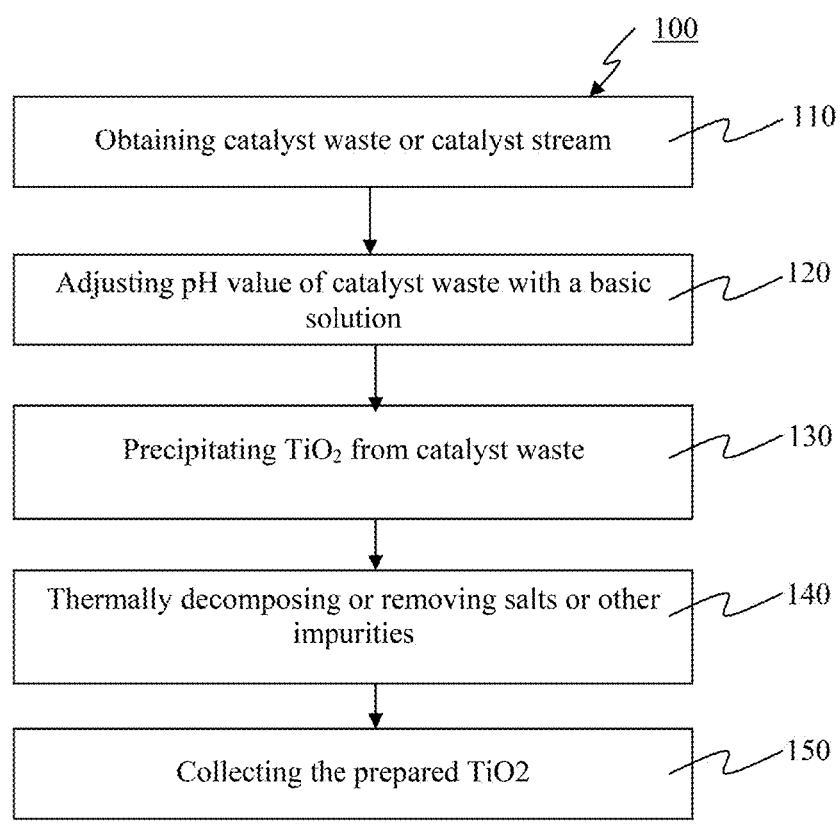
FIG. 1 is a flowchart of a process for extracting or obtaining $TiO_2$ from polyolefin catalyst waste that is to be used in preparing a high emissivity coating composition according to an embodiment of the disclosure.

It will be appreciated that, although specific embodiments of the present disclosure have been described herein for purposes of illustration, various modifications may be made without departing from the spirit and scope of the disclosure. Accordingly, the disclosure is not limited except as by the appended claims.

In the following description, certain specific details are set forth in order to provide a thorough understanding of various aspects of the disclosed subject matter. However, the disclosed subject matter may be practiced without these specific details. In some instances, well-known structures and methods of mixing ceramic precursors, recovering titanium dioxide, and applying high emissivity coatings to substrates comprising embodiments of the subject matter disclosed herein have not been described in detail to avoid obscuring the descriptions of other aspects of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

Embodiments of the present disclosure are directed to high emissivity coating compositions in which titanium dioxide ($TiO_2$) is used as an emissivity enhancing agent, in contrast to prior high emissivity coating compositions in which $TiO_2$ has been simply used as a filler. However, under high temperature conditions, the present inventors have observed that $TiO_2$ exhibits emissivity enhancing properties due to a temperature induced $TiO_2$ microstructure transformation. $TiO_2$ has three natural forms: anatase, rutile, and brookite. Anatase is mainly used for photocatalytic application due to its UV absorption properties. Anatase is transformed to produce rutile at temperatures above 700° C. and rutile is commonly used in pigment, cosmetic and ceramic industries. Rutile is stable at high temperature and has been observed by the present inventors to be a good energy emissivity agent. Brookite has less utilization due to its limited availability.

The use of $TiO_2$ in prior coating compositions as a filler has typically adversely affected coating composition price due to high $TiO_2$ cost. Embodiments of the present disclosure provide a coating composition comprising $TiO_2$ as an emissivity agent or an emissivity enhancer wherein the $TiO_2$ is obtained in a cost-effective manner without comprising overall function or characteristics of the $TiO_2$ in the coating composition. Particular embodiments of the present disclosure provide coating compositions containing $TiO_2$, in which the $TiO_2$ is obtained from an industrial waste source, for instance, a waste stream associated with the production of a polyolefin catalyst. Obtaining $TiO_2$ from such types of waste sources results in lower costs for the $TiO_2$, which improves the economic aspects of producing high emissivity coating compositions that include such $TiO_2$. A process, method, or technique for obtaining $TiO_2$ from an industrial waste source is detailed below in relation to aspects of a high emissivity coating composition manufacturing process.

As will be described in more detail below, a high emissivity coating, coating system or coating composition according to the present disclosure is referred to herein as a "coating composition." In addition, unless otherwise stated, all percentages (%) are percent weight-by-weight, also expressed as % by weight, % (w/w), wt % or simply %. The term "wet admixture" refers to the relative weight percentages of the constituents or components of a coating composition in solution or with respect to a solution, and the term "dry admixture" refers to the relative percentages of the constituents or components of the dry coating composition separate from or prior to the addition of water and any liquid state reagents. A person of ordinary skill in the art will understand the manner in which wet admixture and dry admixture weight percentages are related or convertible.

In the context of the present disclosure, the term "set" is defined as a non-empty finite organization of elements that mathematically exhibits a cardinality (number of elements of a set) of at least 1 (i.e., a set as defined herein can correspond to a singlet or single element set, or a multiple element set), in accordance with known mathematical definitions (for instance, in a manner corresponding to that described in *An Introduction to Mathematical Reasoning: Numbers, Sets, and Functions*, "Chapter 11: Properties of Finite Sets" (e.g., as indicated on p. 140), by Peter J. Eccles, Cambridge University Press (1998)).

Coating compositions in accordance with the present disclosure include (in a wet admixture) (1) approximately 2% to 60% by weight of a set or group of fillers, which excludes $TiO_2$; (2) approximately 5% to 70% by weight of a set or group of emissivity agents or emissivity enhancers, which includes $TiO_2$, and which can further include silicon carbide (SiC) and/or chromium oxide ($Cr_2O_3$), (3) approximately 5% to 20% by weight of a set or group of matrix strength enhancers, and (4) approximately 2% to 30% by weight of a set or group of binders.

Fillers as used in the present disclosure are materials that are added to other materials to lower the consumption of more expensive components in high emissivity coating compositions. Fillers useful in the present disclosure include, but are not limited to, aluminum oxide ($Al_2O_3$), silicon dioxide ($SiO_2$), magnesium oxide (MgO), calcium oxide (CaO), and boron oxide ($B_2O_3$).

As used in the present disclosure, emissivity agents or emissivity enhancers are materials that increase the emissivity of high emissivity coating compositions to which the emissivity agent or enhancer is added. Suitable emissivity agents or emissivity enhancers include, but are not limited to, titanium dioxide ($TiO_2$), silicon carbide (SiC), chromium oxide ($Cr_2O_3$), silicon dioxide ($SiO_2$), iron oxide ($Fe_2O_3$), boron silicide ($B_4Si$), boron carbide ($B_4C$), silicon tetraboride ($SiB_4$), molybdenum disilicide ($MoSi_2$), tungsten disilicide ($WSi_2$), and zirconium diboride ($ZrB_2$).

As used in the present disclosure, matrix strength enhancers or thermal strength enhancers are materials that increase the resistance to stress and thermal stress of high emissivity coating compositions that include such matrix strength or thermal strength enhancers. In various embodiments, useful matrix strength enhancers or thermal strength enhancers include, but are not limited to, ceramic borides, ceramic carbides, and/or ceramic nitrides (e.g., Ultra High Temperature Ceramics (UHTCs), which exhibit high melting point, substantial chemical inertness, and relatively good oxidation resistance in extreme thermal environments. In particular embodiments, matrix strength enhancers include, but are not limited to silicon carbide (SiC), hafnium diboride ($HfB_2$), hafnium carbide (HfC), hafnium nitride (FIN), tantalum diboride ($TaB_2$), tantalum carbide (TaC), tantalum nitride (TaN), titanium diboride ($TiB_2$), titanium carbide (TiC), titanium nitride (TiN), zirconium diboride ($ZrB_2$), zirconium carbide (ZrC), and zirconium nitride (ZrN). Additionally, in certain embodiments, thermal strength can be enhanced by the inclusion of binders such as, but not limited to, phosphoric acid ($H_3PO_4$), a sodium aluminosilicate and/or a potassium aluminosilicate to form, for instance, $Al_2(H_2P_2O_7)$, $Al(PO_3)_3$, $AlPO_4$, and/or $KAlSi_3O_8$. A specific example of a binder is an aqueous solution containing phosphoric acid ($H_3PO_4$) and sodium silicate.

The present inventors observed that a constituent dependent tradeoff can exist between coating composition emissivity, adhesion to substrates, and temperature stability. In other words, adjustment of weight percentages of particular constituents in a coating composition can result in changes in emissivity, temperature stability, and adhesion capability of the coating composition. In order to simultaneously enhance emissivity, coating adhesion or cohesion, and high temperature thermal and chemical stability, some coating composition embodiments in accordance with the present disclosure include or establish a particular weight percentage of $TiO_2$ relative to the weight percentages of one or more other coating composition constituents, such as $Al_2O_3$. For instance, particular coating composition embodiments include at least approximately 8% to 10% $TiO_2$ by weight with respect to a wet admixture. Additionally or alternatively, coating composition embodiments in accordance with the present disclosure can include less than approximately 20% to 22% $TiO_2$ by weight with respect to a wet admixture, where a weight percentage of $Al_2O_3$ can be established or adjusted based upon the selection of a given $TiO_2$ weight percentage. In certain embodiments, the weight percentages of $Al_2O_3$ and $TiO_2$ can be varied or adjusted to achieve varying emissivity and matrix adhesion capability. In some embodiments, wet admixture weight percentages of $TiO_2$ and $Al_2O_3$ can be selected as approximately 20% and 22%, respectively, especially when the $TiO_2$ is recovered from a waste source of $TiO_2$. In embodiments where the $TiO_2$ is from commercial sources, wet admixture weight percentages of $TiO_2$ and $Al_2O_3$ can be selected as approximately 18% and 16%, respectively. In particular embodiments, wet admixture weight percentages of $TiO_2$ and $Al_2O_3$ can be selected as approximately 10% and 32%, respectively. In the three foregoing embodiments on a dry basis, SiC is present in an amount less than 30 wt %, less than about 20 wt %, between about 8 wt % and less than 30 wt %, and between about 8 wt % and about 20 wt %. In a specific embodiment, the SiC content is about 14 wt % on a dry basis.

In some embodiments, use of a set or group of matrix strength enhancers improves the strength as well as the adhesion within a matrix of a coating composition. More particularly, matrix strength enhancers possess an ability to decompose at working or operating temperatures to form or create new, altered, or reformulated matrices with other coating composition constituents such as fillers. Such matrix strength enhancers can include one or more ceramic borides, ceramic carbides, or ceramic nitrides. In multiple embodiments, SiC acts as a matrix strength enhancer that can decompose to $SiO_2$ and $CO_2$ at temperatures above about 400° C. and form a new matrix with aluminum oxide and silicon dioxide ($Al_2O_3$—$SiO_2$—SiC). The $Al_2O_3$—$SiO_2$—SiC ceramic matrix helps to enhance mechanical strength, i.e., bonding strength between particles in the coating. More $Al_2O_3$—$SiO_2$—SiC matrixes are generated when more SiC is present in the coating. The inventors observed that the generated $Al_2O_3$—$SiO_2$—SiC matrixes can increase the strength of the original matrix; however, it was also observed that too many $Al_2O_3$—$SiO_2$—SiC matrices can result in defects in the matrix. At certain levels of SiC content in the coating composition, these matrix defects will be predominant and cause reduced mechanical strength as evidenced by shrinkage of the coating composition. Such shrinkage can cause the coating composition to crack and delaminate when the coating is adhered to the substrate to which it has been applied. Moreover, it was observed that as more SiC decomposes to $SiO_2$ and more $CO_2$ is generated from the decomposition reaction, more $CO_2$ tries to diffuse through the coating composition. This $CO_2$ diffusion is evidence by small bubbles or voids underneath the surface of the coating composition. These small bubbles or voids can also lower mechanical strength of the coating composition which results in shorter service life of the coating composition.

Figure 4A:
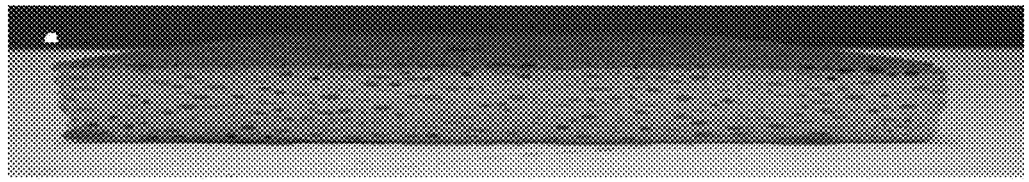
FIGS. 4A-4C are photos of cross sections of coating compositions applied to a substrate after being subjected to simulated decoking conditions.
Figure 4B:
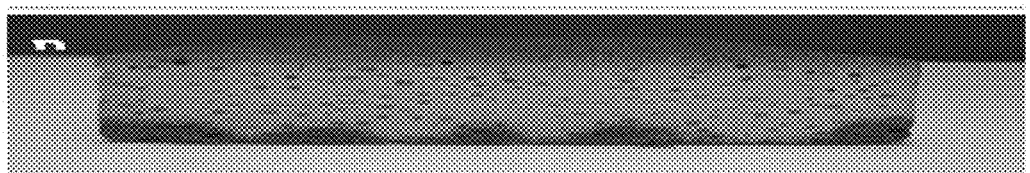
Figure 4C:
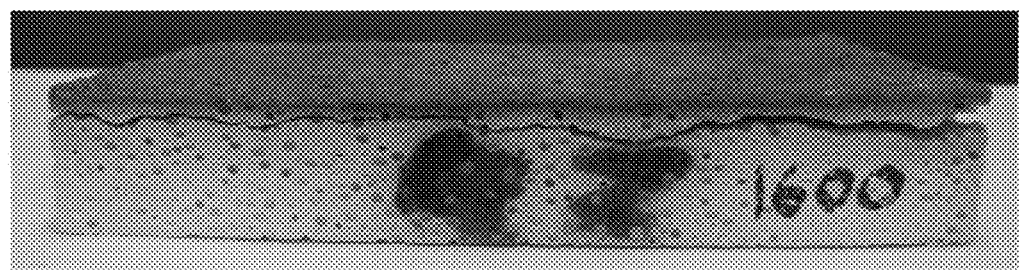

FIGS. 4A and 4B show photographs of cross sections of coating compositions in accordance with embodiments described herein applied to a substrate after being subjected to conditions simulating multiple decoking cycles in a naphtha cracking furnace (i.e., 22 cycles between room temperature and holding at 1600° C. for one hour). In FIGS. 4A and 4B no separation between the coating composition and the underlying substrate is visible. FIG. 4C shows a photograph of a cross-section of a commercially available high emissivity coating composition applied to a substrate and subjected to five of the same simulated decoking cycles as the samples in FIGS. 4A and 4B. The sample in FIG. 4C shows a visible crack between the coating and the substrate, evidencing delamination between the coating and the substrate.

Additionally or alternatively, in certain embodiments, matrix strength enhancers can include one or more of hafnium diboride ($HfB_2$), hafnium carbide (HfC), hafnium nitride (HfN), tantalum diboride ($TaB_2$), tantalum carbide (TaC), tantalum nitride (TaN), titanium diboride ($TiB_2$), titanium carbide (TiC), titanium nitride (TiN), zirconium diboride ($ZrB_2$), zirconium carbide (ZrC), and zirconium nitride (ZrN).

As stated above, coating compositions in accordance with the present disclosure can include one or more chemicals or substances that serve as binders or binding agents. Such binders promote bonding between a coating composition and a substrate on which the coating composition is applied. Furthermore, said binders facilitate or effectuate support for the coating composition by promoting binding between molecules of the coating, (e.g., between $Al_2O_3$ and $Al_2O_3$ molecules) which facilitate creating a matrix structure of the coating composition matrix itself. In multiple embodiments, a binder is or includes an aqueous solution containing $H_3PO_4$. In various embodiments depending upon the type of substrate, the binder is or includes sodium silicate ($Na_2SiO_3$). In certain embodiments, the binders facilitate or effectuate the support of an $Al_2O_3$—$SiO_2$—SiC matrix.

One embodiment of a high emissivity coating composition in accordance with the present disclosure includes a dry admixture of approximately 2.8% to 75% $Al_2O_3$, approximately 13.9% to 27.8% $TiO_2$, approximately 8.3% to 25.0% SiC, approximately 4.2% to 11.1% chromium oxide $Cr_2O_3$, and approximately 5.6% $SiO_2$, where each of the foregoing percentages are weight percentages. The corresponding coating composition in a solution or slurry form (in a wet admixture) includes, on a weight percentage basis, from approximately 2% to 54% $Al_2O_3$, approximately 10% to 40% $TiO_2$, approximately 6% to 18% SiC, approximately 3% to 8% $Cr_2O_3$, approximately 4% $SiO_2$, and from approximately 2% to 28% water containing $H_3PO_4$.

In addition to the foregoing, colorants can be included in the coating composition to form colored coating compositions. Examples of colorants include but are not limited to yellow cadmium, orange cadmium, red cadmium, deep orange cadmium, orange cadmium lithopone, and red cadmium lithopone. A colorant range or dilution ratio can be obtained from the colorant manufacturer's specifications. Stabilizers known to enhance high temperature strength in refractory applications can also be incorporated into the coating compositions as required. Examples of stabilizers include but are not limited to bentonite, kaolin, magnesium alumina silica clay, stabilized zirconium oxide, tabular alumina, and other ball clay stabilizers.

Aspects of High Emissivity Coating Composition Manufacturing Processes

Process Aspects for Extracting or Obtaining $TiO_2$ from a Polyolefin Catalyst Waste FIG. 1 shows a flowchart of a process 100 for extracting or obtaining $TiO_2$ for use in preparing a high emissivity coating, coating system or coating composition (hereinafter collectively referred to as a coating composition) according to an embodiment of the present disclosure from a waste source, waste stream, or waste solution containing a polyolefin catalyst. As used herein, waste source, waste stream, and waste solution are used interchangeably and include but are not limited to process streams or process batches that include catalysts that have been used in a polymerization process, such as the polymerization of olefins to produce polyolefins. Waste sources, waste streams and waste solutions are not necessarily intended for disposal and include streams, solutions, and sources that contain the spent catalyst and can be reactivated for reuse.

In a first process portion 110, at least one source, stream, or solution including $TiO_2$ and/or one or more Ti compounds or compositions in one or more forms from which $TiO_2$ can be obtained or extracted, for example a waste source, stream, or solution that includes $TiO_2$ and/or one or more Ti compounds or compositions in one or more forms from which $TiO_2$ can be obtained or extracted, is provided or obtained.

In accordance with embodiments of the present disclosure, a waste source, stream, or solution containing catalyst associated with a polyethylene polymerization process is provided. Such a catalyst containing waste source, stream, or solution can include or carry $TiO_2$. In various embodiments, the catalyst containing waste source, stream, or solution including $TiO_2$ can be obtained from processes involving Ziegler-Natta catalysts, for example processes associated with preparation and use of Ziegler-Natta catalysts.

In certain embodiments, a catalyst containing waste source can be obtained from a process involving homo- or co-polymerization of other olefins, including polypropylene, polybutene, polymethylpentene, polycycloolefins, polycritadiene, polyisopropene, amorphous poly-alpha-olefins and polyacetylene. In various embodiments, a suitable catalyst containing waste source, stream, or solution can additionally or alternatively be obtained from other processes that utilize catalyst systems that include $TiO_2$-rich sources and/or Ti bearing sources from which adequate or substantial amounts of $TiO_2$ can be obtained or extracted, and which involve a generally straightforward and/or economical extraction process.

In particular embodiments, a source, stream, or solution including $TiO_2$ can be obtained from ilmenite-type ore (i.e., an ore-based $TiO_2$ source). For instance, the source, stream, or solution including $TiO_2$ can be obtained from ilmenite-type ore using a membrane based electrodialysis process (e.g., a membrane based electrodialysis process as described by U.S. Pat. No. 4,107,264) or an organophosphoric acid extraction process (e.g., for example an organophosphoric acid extraction process for impurity removal as described by U.S. Pat. No. 4,168,297). In addition, or as an alternative, in specific embodiments, a source, stream, or solution including $TiO_2$ provided in the first process portion 110 can be obtained via $TiO_2$ pigment production processes, for example a $TiO_2$ pigment production process described in U.S. Pat. No. 5,094,834.

In a second process portion 120, a known quantity and concentration of a basic solution or material is introduced or added to the $TiO_2$ source(s) under consideration (e.g., catalyst containing waste and/or ore-based $TiO_2$ source) to thereby adjust the pH value of the catalyst containing waste source. In representative embodiments, the basic solution can include but are not limited to one of sodium hydroxide (NaOH) and ammonium hydroxide ($NH_4OH$). For instance, adding NaOH can adjust the pH of a catalyst containing waste source, stream, or solution from approximately 1.0 to 9.0, or from approximately 2.0 to 8.0, or from approximately 2.0 to 7.0. The one or more other basic solutions used to adjust pH of the catalyst containing waste source, stream, or solution preferably do not react with $TiO_2$.

A third process portion 130 involves precipitating or separating $TiO_2$ from the (pH adjusted) $TiO_2$ source(s) under consideration, for instance catalyst containing waste and/or ore-based $TiO_2$ source. In multiple embodiments, the treated $TiO_2$ source is allowed to settle, facilitate, or effectuate precipitation of $TiO_2$. The time duration allowed for the settling or precipitation, and hence complete separation, can be adjusted or selected as required to achieve the desired separation. For instance, the $TiO_2$ source can be allowed to settle for approximately 10 hours, 12 hours, 15 hours, or more.

In a fourth process portion 140, the precipitated $TiO_2$ is recovered and extensively washed for impurity removal, including the removal of salts such as sodium chloride (NaCl). In several embodiments, the collected precipitated $TiO_2$ is washed with deionized water, for instance, approximately 3 to 6 times or more. Subsequent to washing, the precipitated $TiO_2$ is thermally treated in the presence of oxygen to thermally decompose the $TiO_2$ to rutile and/or to remove volatile fractions. The thermal treatment process can be carried out at temperatures of approximately 900° C. to approximately 1100° C. The temperature of the thermal treatment can be adjusted and is typically below the melting point of $TiO_2$, which is approximately 1660±10° C. The duration of a calcination or thermal treatment process can be approximately 4 hours, 5 hours, or longer (e.g., about 7 or more hours).

In a fifth process portion 150, the resultant $TiO_2$ is collected upon completion of the calcination reaction(s) or thermal treatment process(es). The collected $TiO_2$ may be allowed to cool down and is then ground to an average particle size less than approximately 65-mesh. It will be understood by one of ordinary skill in the art that the $TiO_2$ can be readily ground to other average particle sizes or equivalent US sieve series or Tyler mesh sizes larger or smaller than 65-mesh.

Figure 2:
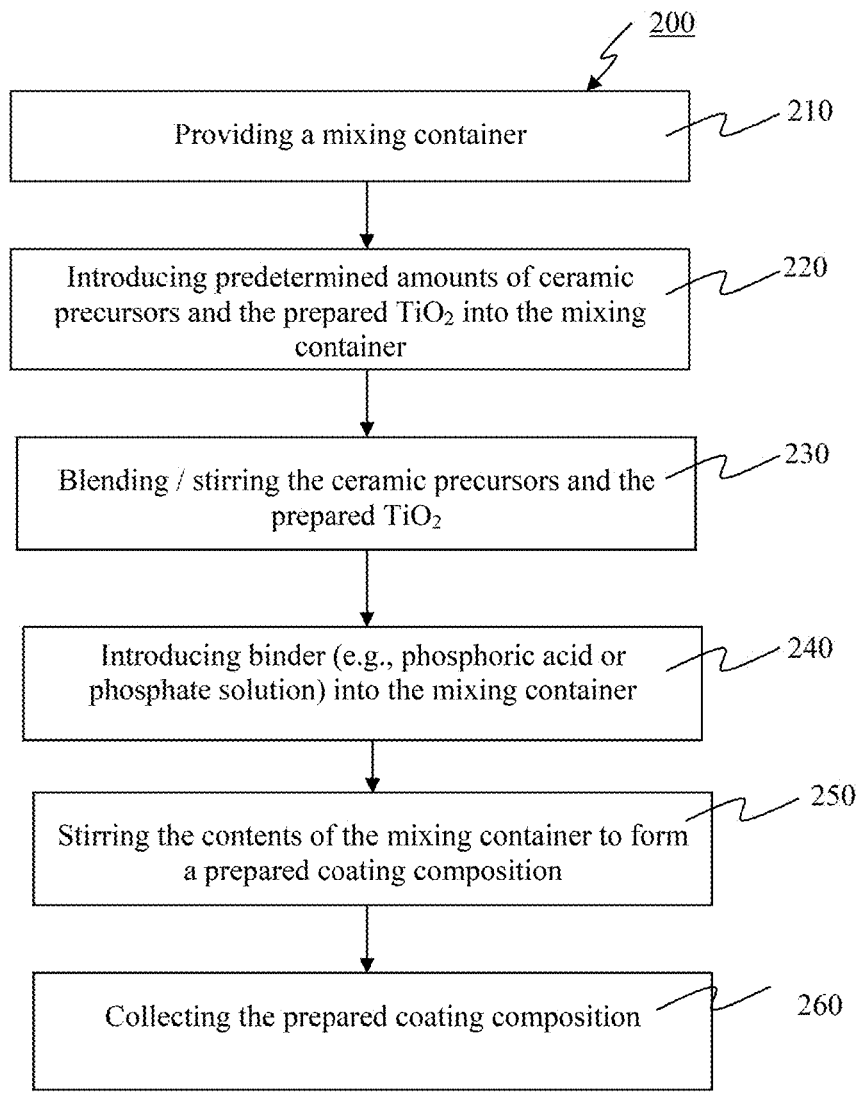
FIG. 2 is a flowchart of a process for preparing or producing a high emissivity coating composition according to an embodiment of the disclosure.

Aspects of Processes for Preparing or Producing High Emissivity Coating Compositions FIG. 2 illustrates a flowchart of a process 200 for preparing or producing a coating composition according to embodiments of the present disclosure.

In the embodiments described with reference to FIG. 2, the process 200 for preparing or producing a coating composition occurs in a batch-wise manner. It should be understood that embodiments of preparing coating compositions described herein are not limited batch-wise processes and continuous processes can be used. In a first process portion 210, a mixing container or a mixing tank is provided. The mixing container is configured to facilitate the mixing and distribution of particles or content therein. A wide variety of mixing containers are known in the art. Generally, such mixing containers are equipped with at least some form of an impeller, stirrer, and/or baffles, and optionally further equipped with rotating blades.

In a second process portion 220, predetermined amounts of ceramic precursors, emissivity agents or emissivity enhancers, and matrix strength enhancers used for preparing a coating composition are introduced into the mixing container. Such ceramic precursors include a filler selected from aluminum oxide ($Al_2O_3$), silicon dioxide ($SiO_2$), magnesium oxide (MgO), calcium oxide (CaO), and boron oxide ($B_2O_3$). An exemplary emissivity agent or emissivity enhancer includes titanium dioxide ($TiO_2$), and in some embodiments an additional emissivity enhancer is selected from silicon carbide (SiC), chromium oxide ($Cr_2O_3$), silicon dioxide ($SiO_2$), iron oxide ($Fe_2O_3$), boron silicide ($B_4Si$), boron carbide ($B_4C$), silicon tetraboride ($SiB_4$), molybdenum disilicide ($MoSi_2$), tungsten disilicide ($WSi_2$), and zirconium diboride ($ZrB_2$). Examples of matrix strength enhancers include silicon carbide (SiC), hafnium diboride ($HfB_2$), hafnium carbide (HfC), hafnium nitride (HfN), tantalum diboride ($TaB_2$), tantalum carbide (TaC), tantalum nitride (TaN), titanium diboride ($TiB_2$), titanium carbide (TiC), titanium nitride (TiN), zirconium diboride ($ZrB_2$), zirconium carbide (ZrC), and zirconium nitride (ZrN). In multiple embodiments, the ceramic precursors, emissivity agents or emissivity enhancers, and matrix strength enhancers have a specific or predetermined average particle size selected to ensure uniform mixing. For instance, the ceramic precursors, emissivity agents or emissivity enhancers, and matrix strength enhancers may have a particle size of approximately 65-mesh, approximately 200-mesh, or approximately 325-mesh.

In a third process portion 230, the coating composition components are stirred or blended in the mixing container in accordance with a set of mixing parameters intended to produce a well mixed mixture substantially free of residues larger than about 250 microns.

A fourth process portion 240 involves addition of at least one binder into the mixing container. As previously described, a binder supports a coating composition matrix and aids in promoting bonding between the coating composition and a substrate or surface on which the coating composition is applied. Hence, the binder(s) are selected based upon the type of substrate to which the coating composition is to be applied. In a number of embodiments, when the substrate is selected from at least one of silica insulating brick, ceramic fiber, ceramic module, refractory brick, plastic refractory, castable refractory, fiberlite, ceramic tiles, an array of fiber board, and refractory mortar, an aqueous solution containing phosphoric acid ($H_3PO_4$) can be used as a binder. The concentration of phosphoric acid can be chosen, for instance, to range from approximately 10%, 15%, or 20% volume/volume. In several embodiments, when the substrate is a metal, sodium silicate ($Na_2SiO_3$) is a suitable binder.

In a fifth process portion 250, subsequent to an addition of the binder into the mixing container, the mixture content, which includes the ceramic precursors and the binder, is stirred or agitated to achieve uniform binder dispersion evidenced by residues no larger than about 250 microns.

Figure 3:
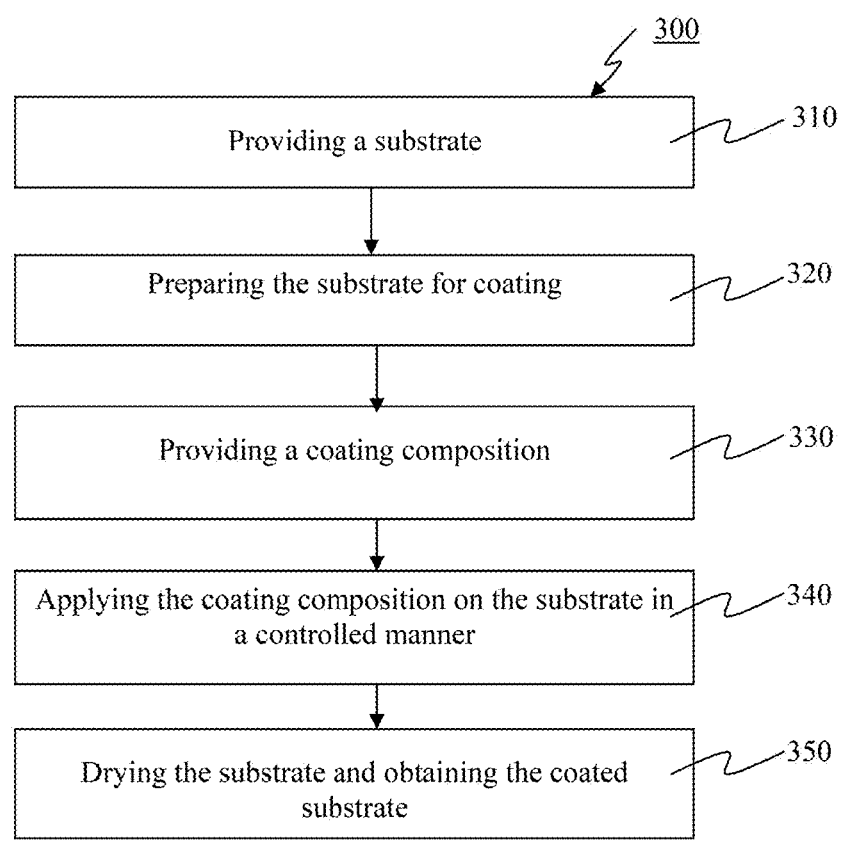
FIG. 3 is a flowchart of a process for applying a high emissivity coating composition to a substrate according to an embodiment of the disclosure.

In a sixth process portion 260, the resultant coating composition is collected from the mixing container. The coating composition can be transferred to a bucket or individual container having a predefined volume for storing, containing, receiving, or holding the coating composition. Aspects of Processes for Applying a Coating Composition on a Substrate FIG. 3 is a flowchart of a process for applying a coating composition on a substrate according to embodiments of the present disclosure.

In a first process portion 310, a substrate is provided. The substrate can be selected from at least one of silica insulating brick, ceramic fiber, ceramic module, refractory brick, plastic refractory, castable refractory, refractory mortar, fiberlite, ceramic tiles, an array of fiber board, and metal. The substrate can be an inner lining, structure, and/or part of a furnace (e.g., a cracking furnace), a fire heater, preheater, reformer, other refractory equipment in the field, ceramic automotive parts, refractory aerospace parts, or marine parts that are subjected to high temperature when in use.

In a second process portion 320, the substrate is prepared for coating. In particular embodiments, the substrate is cured, baked, or cleaned prior to coating. For instance, the substrate can be cured by heating to a desired temperature for a specific duration to remove moisture and chemicals. In some embodiments, the substrate is cleaned using a dust collector to remove dust or particles that may adversely impact or interfere with bonding between the substrate and the coating composition.

In a third process portion 330, a coating composition in accordance with embodiments of the present disclosure is provided. The coating composition can be prepared in a manner identical or analogous to that described herein, and can be in the form of slurry. Prior to using, if necessary, the coating composition is agitated to ensure complete particle dispersion because particles or sediments in the coating composition may settle during storage. A portable electric mixer can be used for stirring the coating composition prior to applying the coating composition to a substrate in a field operation. It is understood that other types of mixers or agitators or stirrers can also be used.

In a fourth process portion 340, the coating composition is applied to the surface of the substrate in a controlled manner. The coating composition can be applied to the surface of the substrate using methods (i.e., surface coating methods) known to a person skilled in the relevant art. Exemplary methods include application with a brush, blade, or sprayer.

In a fifth process portion 350, the coated substrate is subjected to a drying process. For instance, the coating on the substrate can be allowed to dry for approximately 1 to 3 days or more.

The following representative Examples 1 through 3 illustrate effects, functions, and/or properties of coating compositions of the type described in the present disclosure. It will be understood by a person of ordinary skill in the art that the scope of the present disclosure is not limited to the following representative examples.

EXAMPLES

Example 1

Effect of Variation of $TiO_2$ Content on Emissivity of Coating Compositions

This example illustrates the effect of $TiO_2$ content on the emissivity of coating compositions. Generally speaking, increasing the amount of $TiO_2$ increases the emissivity and this increase in emissivity as a result of increasing $TiO_2$ content is more pronounced at 400° C. to 1000° C. and less pronounced at 1100° C. and 1200° C. and least pronounced at 1300° C. This suggests that as the temperature at which the emissivity value is determined increases, the impact on the emissivity value of increasing the $TiO_2$ content decreases.

Experiments were conducted to study the effect of $TiO_2$ content on emissivity of a coating composition when $TiO_2$ was used as an emissivity agent or an emissivity enhancer in preparing a coating composition in accordance with the second process portion 220 in FIG. 2.

Five emissivity coating compositions (A), (B), (C), (D), and (E), were prepared. After preparation of each of the coating compositions, they were applied by spraying on specimens of insulating brick with defined dimensions. The spray coating of high emissivity coating composition was performed using a commercial spray gun. To achieve smooth and good coverage, the bulk density of the coating composition was controlled to about 1.50-1.70 kg/L. A nozzle diameter of about 1-2 mm and pressure of about 4-5 bar were employed. The distance between nozzle and coating surface was maintained at about 50 cm. The insulating brick was 20×20×2.5 cm and a coating rate of about 1.8 kg/m2 was used. The coated substrates were heated in a high temperature furnace at 800° C. for 5 hr to cure the coating and then the coating was allowed to cool to ambient temperature. The cooled coated substrates were tested to determine their emissivity.

The emissivity was measured using a standard pyrometer. Each substrate sample was heated to the indicated temperature, the temperature of the substrate was measured, and the emissivity value was adjusted to force the pyrometer to display the correct temperature. The emissivity values of each of the coating compositions (A) to (E) at temperatures ranging from approximately 400° C. to 1300° C. were measured. It is also understood by a person having ordinary skill in the art that other methods or techniques may be alternatively used to measure emissivity value so long as the same technique is used for each specimen.

Preparation of Coating Compositions (A) to (E)

Each coating composition (A) to (E) was prepared using predetermined amounts of ceramic precursors and an emissivity enhancer. Ceramic precursors used included aluminum oxide ($Al_2O_3$), silicon carbide (SiC), chromium oxide ($Cr_2O_3$), silicon dioxide ($SiO_2$). Titanium dioxide ($TiO_2$) was used as an emissivity enhancer. Unless stated otherwise, ceramic precursors and titanium dioxide were derived from commercially available sources. Ceramic precursors used for preparing each of coating compositions (A) to (E) had an average particle size less than approximately 325-mesh.

On a wet admixture basis, weight percentages of $TiO_2$ in each of final coating compositions (A) to (E) were varied between approximately 10% and 40%, while those of SiC, $Cr_2O_3$, and $SiO_2$ were held constant. Additionally, weight percentages of $Al_2O_3$ were varied in a decreasing manner between approximately 42% and 2% relative to increasing weight percentages of $TiO_2$ in order to evaluate the effect(s) of $TiO_2$ content on emissivity when the amount of a filler is decreased and an amount of $TiO_2$ is increased.

The content of ceramic precursors in each of coating compositions (A) to (E) was as follows:

Coating Composition (A)

Coating composition (A) included approximately 42% $Al_2O_3$, 0% $TiO_2$, 18% SiC, 8% $Cr_2O_3$, and 4% $SiO_2$ by weight.

Coating Composition (B)

Coating composition (B) included approximately 32% $Al_2O_3$, 10% $TiO_2$, 18% SiC, 8% $Cr_2O_3$, and 4% $SiO_2$ by weight.

Coating Composition (C)

Coating composition (C) included approximately 22% $Al_2O_3$, 20% $TiO_2$, 18% SiC, 8% of $Cr_2O_3$, and 4% $SiO_2$ by weight.

Coating Composition (D)

Coating composition (D) included approximately 12% $Al_2O_3$, 30% $TiO_2$, 18% SiC, 8% $Cr_2O_3$, and 4% $SiO_2$ by weight.

Coating Composition (E)

Coating composition (E) included approximately 2% $Al_2O_3$, 40% $TiO_2$, 18% SiC, 8% $Cr_2O_3$, and 4% $SiO_2$ by weight.

Predetermined amounts of the ceramic precursors and emissivity enhancing agent described above were introduced into and then stirred in a mixing tank that achieved uniform mixing as evidenced by the absence of residue larger than about 250 microns. Subsequent to stirring, an aqueous solution containing phosphoric acid ($H_3PO_4$) at approximately 17% volume/volume was introduced into the mixing tank as a binder. More specifically, approximately 28% by weight of the aqueous solution containing 17% volume/volume of $H_3PO_4$ was added into the stirred mixture to make up a total of 100% by weight. The resulting mixture was allowed to stir for several minutes and the coating compositions were obtained therefrom.

The coating compositions were applied to the substrates using the technique described above.

Results

As illustrated in Table 1, in coating compositions (A) to (E) increasing $TiO_2$ content resulted in increasing emissivity, where emissivity increases were particularly evident at temperatures of approximately 400° C. to 1000° C. More particularly, a weight percentage of $TiO_2$ of approximately 20% or greater resulted in emissivity values of approximately 0.98-0.99 at approximately 1000° C., compared to an emissivity value of approximately 0.93-0.96 in the absence of $TiO_2$. In general, the inclusion of $TiO_2$ in weight percentages of approximately 20% or more led to an approximate 1% to 6% increase in emissivity values, depending upon temperature, relative to coating composition (A) which excluded $TiO_2$. It was observed that at every temperature, adding $TiO_2$ resulted in an increase or at least no decrease in emissivity.

It was noted that coating compositions (C), (D), and (E) produced the highest emissivity values at the different temperatures. Such coating compositions included approximately 20% $TiO_2$ or more, and less than approximately 22% $Al_2O_3$. It was further noted that for temperatures of approximately 400° C. to 1100° C., a $TiO_2$ weight percentage of at least approximately 10% gave rise to a desirable emissivity increase, i.e., 0.03 and 0.01 emissivity units, respectively.

One of ordinary skill in the art will understand that dry admixture weight percentages of the composition constituents given above can be calculated, e.g., by normalizing the specified wet weight percentages with respect to an overall 72% percent dry weight in view of the addition of 28% by weight aqueous solution containing $H_3PO_4$ into the mixing tank or container.

Example 2

Effect of Source of $TiO_2$ on Emissivity of Coating Compositions

This example shows that $TiO_2$ obtained from a catalyst containing waste stream provides the same emissivity values as a coating composition containing $TiO_2$ from non-waste commercial sources.

Experiments were performed comparing the effect the source of $TiO_2$ used as an emissivity agent or an emissivity enhancer had on the emissivity of a coating composition prepared in accordance with the second process portion 220 of FIG. 2.

Four emissivity coating compositions (A), (B), (C), and (D), were prepared. After preparation of each of the coating compositions, the coating compositions were applied using the same substrates and technique described Example 1 above. The emissivity values of each of the coating compositions (A) to (D) at temperatures ranging from approximately 400° C. to 1300° C. were then measured in a manner identical to that described above in Example 1.

Preparation of Coating Compositions (A) to (D)

Each coating composition (A) to (D) was prepared using predetermined amounts of ceramic precursors and an emissivity enhancer. Ceramic precursors included aluminum oxide ($Al_2O_3$), silicon carbide (SiC), chromium oxide ($Cr_2O_3$), and silicon dioxide ($SiO_2$). Titanium dioxide ($TiO_2$) was used as an emissivity enhancer. $Al_2O_3$, SiC, $Cr_2O_3$, and $SiO_2$ were obtained from the same commercial sources that provided the same materials in Example 1. $TiO_2$ was obtained from the same commercial source that provided the $TiO_2$ used in Example 1 or from a polyolefin catalyst containing waste source, stream, or solution such as that described above in relation to the process 100 of FIG. 1. The detailed process for obtaining $TiO_2$ from a polyolefin catalyst containing waste stream used in this example is described below. Ceramic precursors and the emissivity enhancing agent used for preparing each of coating compositions (A) to (D) had an average particle size less than approximately 325-mesh.

On a wet admixture basis, weight percentages of $TiO_2$ in each of final coating compositions (A) and (B) were maintained at approximately 10%, and $TiO_2$ weight percentages of each of final coating compositions (C) and (D) were maintained at approximately 20%. In coating compositions (A) and (B) the weight percentages of $Al_2O_3$ were maintained at approximately 32 wt %. The $Al_2O_3$ weight percentages for coating compositions (C) and (D) were main-

TABLE 1

| Emissivity Coating Compositions/ ($TiO_2$ wt %) | Emissivity value ($\varepsilon$) at specific temperatures | | | | | | | | | |
|---|---|---|---|---|---|---|---|---|---|---|
| | 400° C. | 500° C. | 600° C. | 700° C. | 800° C. | 900° C. | 1000° C. | 1100° C. | 1200° C. | 1300° C. |
| A/0 wt % | 0.96 | 0.96 | 0.96 | 0.96 | 0.96 | 0.95 | 0.93 | 0.86 | 0.84 | 0.81 |
| B/10 wt % | 0.97 | 0.97 | 0.97 | 0.97 | 0.97 | 0.97 | 0.96 | 0.88 | 0.84 | 0.81 |
| C/20 wt % | 0.98 | 0.98 | 0.98 | 0.98 | 0.98 | 0.98 | 0.98 | 0.87 | 0.86 | 0.81 |
| D/30 wt % | 0.99 | 0.99 | 0.99 | 0.99 | 0.99 | 0.99 | 0.99 | 0.88 | 0.85 | 0.83 |
| E/40 wt % | 0.99 | 0.99 | 0.99 | 0.99 | 0.99 | 0.99 | 0.99 | 0.89 | 0.87 | 0.82 | tained at approximately 22 wt %. Weight percentages of SiC, $Cr_2O_3$, and $SiO_2$ were held constant for coating compositions (A) to (D). The content or amount of ceramic precursors and the sources of $TiO_2$ in each of coating compositions (A) to (D) were as follows:

Coating Composition (A)

Coating composition (A) included approximately of 10% $TiO_2$, 32% $Al_2O_3$, 18% SiC, 8% $Cr_2O_3$, and 4% $SiO_2$ by weight. $TiO_2$ was obtained from a commercial source.

Coating Composition (B)

Coating composition (B) included approximately 10% $TiO_2$, 32% $Al_2O_3$, 18% SiC, 8% $Cr_2O_3$, and 4% $SiO_2$ by weight. $TiO_2$ was obtained from a polyolefin catalyst containing waste stream extraction process.

Coating Composition (C) Coating composition (C) included approximately 20% $TiO_2$, 22% $Al_2O_3$, 18% SiC, 8% $Cr_2O_3$, and 4% $SiO_2$ by weight. $TiO_2$ was obtained from a commercial source.

Coating Composition (D)

Coating composition (D) included approximately 20% $TiO_2$, 22% $Al_2O_3$, 18% SiC, 8% $Cr_2O_3$, and 4% $SiO_2$ by weight. $TiO_2$ was obtained from a polyolefin catalyst containing waste stream extraction process.

Extraction of $TiO_2$ From Polyolefin Catalyst Containing Waste Streams

The polyolefin catalyst containing waste stream used as a source of $TiO_2$ in Example 2 was obtained from a polyethylene manufacturing process.

Results

Emissivity values for specimens carrying coating compositions (A) to (D) were determined in the same manner as described in Example 1. Results showing the emissivity value of each of coating compositions (A) to (D) are provided in Table 2 below. Results show that, at an equal weight fraction of 10% $TiO_2$ and ceramic precursors used, coating composition (B) has an identical or essentially identical emissivity value at temperatures of approximately 1000° C. and 1300° C. and almost or approximately identical emissivity value at temperatures of approximately 1100° C. and 1200° C. as coating composition (A). In addition, results also demonstrate that, at an equal weight fraction of 20% $TiO_2$ and identical weight fractions of ceramic precursors, coating composition (D) has an identical emissivity value at temperatures of approximately 1100° C. and an almost or approximately identical emissivity value at temperatures of approximately 1000° C., 1200° C. and 1300° C. as compared to coating composition (C). These results indicate that coating compositions prepared using $TiO_2$ from a polyolefin catalyst containing waste source as described in the present disclosure, which functions as an emissivity agent or emissivity enhancer, possess identical, essentially identical, approximately identical, or comparable emissivity values depending on the temperature at which emissivity is measured as compared to coating compositions prepared using $TiO_2$ from a non-waste commercial source.

TABLE 2

| Emissivity Coating | Emissivity value (ε) at specific temperatures | | | | | | | | | |
|---|---|---|---|---|---|---|---|---|---|---|
| Compositions/ Wt % $TiO_2$ | 400° C. | 500° C. | 600° C. | 700° C. | 800° C. | 900° C. | 1000° C. | 1100° C. | 1200° C. | 1300° C. |
| A/10 wt % | 0.96 | 0.96 | 0.96 | 0.96 | 0.96 | 0.96 | 0.96 | 0.88 | 0.84 | 0.81 |
| B/10 wt % waste | 0.97 | 0.97 | 0.97 | 0.97 | 0.97 | 0.97 | 0.96 | 0.86 | 0.85 | 0.81 |
| C/20 wt % | 0.98 | 0.98 | 0.98 | 0.98 | 0.98 | 0.98 | 0.98 | 0.87 | 0.86 | 0.81 |
| D/20 wt % waste | 0.99 | 0.99 | 0.99 | 0.99 | 0.99 | 0.99 | 0.99 | 0.87 | 0.84 | 0.82 |

Polyethylene catalyst containing waste stream or effluent (hereafter "PE catalyst waste") was collected from a polyethylene manufacturing process. The pH of the PE catalyst waste was adjusted from approximately 2.0 to 7.0 by introducing a solution containing sodium hydroxide (NaOH). Upon pH adjustment, $TiO_2$ and $Al(OH)_2$ precipitated out and the mixture was allowed to settle overnight. The precipitated portion containing $TiO_2$ was extensively washed with demineralized water approximately 4-5 times to remove salts such as sodium chloride (NaCl). The washed $TiO_2$ was subsequently dried at approximately 500° C. overnight and calcined at approximately 1000° C. for about 5 hours to remove volatile fractions and ensure the $TiO_2$ was in its rutile form. The resulting $TiO_2$ was ground to an average particle size less than approximately 65-mesh.

The ceramic precursors and $TiO_2$ were introduced into and stirred in a mixing tank. Subsequent to the stirring, an aqueous solution containing phosphoric acid ($H_3PO_4$) at approximately 17% volume/volume was introduced into the mixing tank to serve as a binder. More specifically, approximately 28% by weight of the aqueous solution containing 17% volume/volume of $H_3PO_4$ was added into the stirred ceramic precursors and $TiO_2$ to make up a total of 100% by weight. The resulting mixture was stirred for several minutes and the coating compositions were obtained therefrom.

The mixture was applied to the same type of substrates using the same technique as described above in Example 1.

One of ordinary skill in the art will understand that dry admixture weight percentages of the composition constituents given above can be calculated, e.g., by normalizing the specified wet weight percentages with respect to an overall 72% percent dry weight in view of the addition of 28% by weight aqueous solution containing $H_3PO_4$ into the mixing container.

Example 3

High Emissivity Coating Compositions Surface Adhesion Testing

Experiments were conducted to evaluate bonding between high emissivity coating compositions according to the present disclosure and a substrate to which the coating compositions were applied.

In this example, two coating compositions were prepared as described in the following paragraphs.

Preparation of Coating Compositions (A) and (B)

Coating compositions (A) and (B) were prepared using predetermined amounts of ceramic precursors. Ceramic precursors included aluminum oxide ($Al_2O_3$), silicon carbide (SiC), chromium oxide ($Cr_2O_3$), silicon dioxide ($SiO_2$). Titanium dioxide ($TiO_2$) was employed as an emissivity enhancer. $Al_2O_3$, SiC, $Cr_2O_3$, and $SiO_2$ were derived from commercially available sources, and exhibited an average particle size less than approximately 425-mesh. $TiO_2$ was obtained from recovered polyethylene catalysts as described in Example 2, and had an average particle size less than approximately 65-mesh. The content of ceramic precursors in coating compositions (A) to (B) was as follows:

Coating Composition (A)

Coating composition (A) included approximately 32% $Al_2O_3$, 10% $TiO_2$, 18% SiC, 8% $Cr_2O_3$, and 4% $SiO_2$ by weight.

Coating Composition (B)

Coating composition (B) included approximately 22% $Al_2O_3$, 20% $TiO_2$, 18% SiC, 8% $Cr_2O_3$, and 4% $SiO_2$ by weight.

The ceramic precursors and $TiO_2$ were introduced into and stirred in a mixing tank. Subsequent to stirring, an aqueous solution containing phosphoric acid ($H_3PO_4$) at approximately 17% volume/volume was introduced into the mixing tank to serve as a binder. More specifically, approximately 28% by weight of the aqueous solution containing 17% volume/volume of $H_3PO_4$ was added into the stirred ceramic precursors to make up a total of 100% by weight. The resulting mixture was stirred at 25 rpm for several minutes after which the coating compositions were collected.

In this example, a silica insulating brick was used as a substrate. Prior to application of the coating composition, the substrate was cleaned using a dust collector. The coating composition was sprayed onto the substrate in a controlled manner using a 2.5 millimeter spray gun. More particularly, the pressure of the spray gun was approximately 5-6 bar, and the amount of coating applied was approximately 1-1.6 $kg/m^2$.

Prior to an adhesion test, the coated substrate was heated at approximately 800° C. for approximately 5 hours. The heated substrate was then allowed to cool down to ambient temperature.

The adhesion test was designed to simulate a decoking cycle that occurs in a naphtha cracking furnace. In naphtha cracking furnace operation, the furnace is heated to an operating temperature of approximately 1100° C., and there are typically 8 decoking cycles in one service year. During a decoking cycle, the furnace heated to an operating temperature of approximately 1100° C. is allowed to cool to ambient temperature. After cooling to ambient temperature, the furnace is heated to the operating temperature again to start a second cycle. Therefore, in order to verify that an emissivity coating composition will have at least one service year under typical annual decoking conditions, the adhesion test was performed by heating the coated substrate to approximately 1600° C. (which is approximately 45% higher than an actual operating temperature of a naphtha cracking furnace) for about 5 hours, and then the heated substrate was cooled down to ambient temperature to simulate one decoking cycle. This simulated decoking cycle was repeated 8 times. Subsequent to completion of one decoking cycle, the coating on the substrate was observed for shrinkage and cracking. Optical microscopy, scanning electron microscopy, and/or another observation technique can be used to evaluate aspects of surface and interfacial adhesion of the coating composition to the substrate. In this example, the heating and cooling process, followed by optical observation, inspection and measurement of the coating and substrate to evaluate the condition of the coating composition surface and interfacial adhesion was repeated 8 times. Photographs of cross-sections of an insulating brick to which coating compositions (A) and (B) were applied are presented in FIGS. 4A and 4B.

Coating compositions (A) and (B) were subjected to two types of adhesion tests in accordance with ASTM Designation C1624-05 to assess the quality of the adhesion between the coating and the substrate. The first test was a pull-off test that utilizes a dolly adhered to the coating. In the pull-off test a force was applied to the dolly in a direction away from the surface to which the dolly is adhered. An example of a device useful for carrying out adhesion testing is a PosiTest® Pull Off Adhesion Tester available from DeFelsko Corporation of Ogdensburg, N.Y. The second test was a scratch test to evaluate mechanical failure modes in accordance with ASTM C1624-05.

Results

As observed from optical observation, inspection and measurement of the coating and substrate, both coating compositions (A) and (B) exhibited good adhesion on the silica insulating brick substrates. At a coating thickness of 200 microns, a maximum load of 3000 psi did not pull off the coating from the substrate. A coating thickness of 200 microns exhibited an adhesion strength of 38 N when tested in accordance with the scratch test. In addition, both coating compositions (A) and (B) withstood thermal shock through 8 cycles of heating and cooling.

Figure 5A:
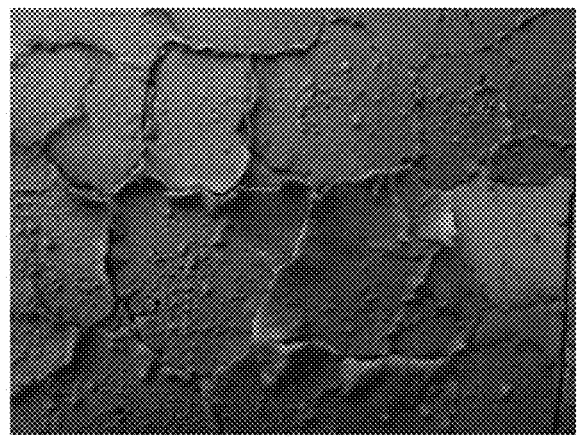
FIGS. 5A-5C are photos of internal wall surfaces of a high temperature furnace coated with a commercially available SiC containing coating composition after operating in the 1000° C. temperature range.
Figure 5B:
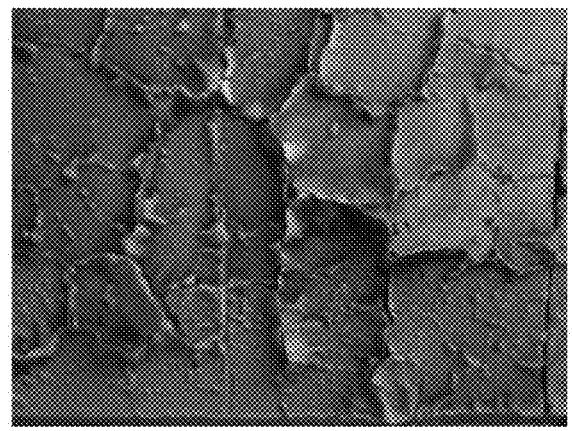
Figure 5C:
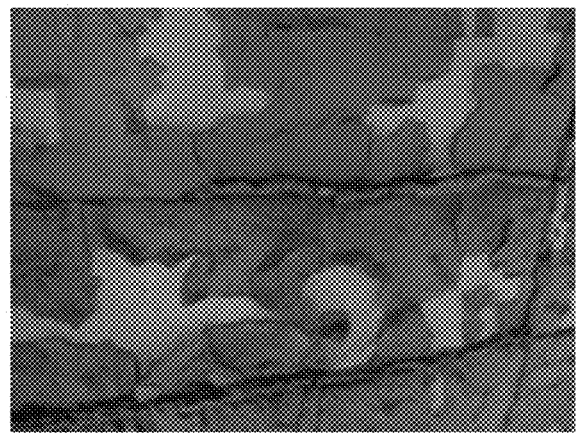

FIG. 4C is an optical image of a commercially available high emissivity coating composition sold under the brand name QZ by SZET having an SiC content of about 23 wt % on a wet basis. The commercially available coating delaminated from the substrate as evidenced by the crack between the substrate and the coating. Such delamination becomes apparent on surfaces that have been coated with high emissivity coatings that do not exhibit the same levels of substrate adhesion, thermal resistance, and mechanical properties as the coating compositions of the disclosed embodiments. FIGS. 5A-5C are photographs of the internal wall surface of a naphtha cracking furnace coated with a commercially available high emissivity coating composition after three years of operation at 1200° C. The coating composition shown in FIGS. 5A-5C exhibited satisfactory performance during the first 3 months of operation during which a 3% to 4% energy savings was observed; however, after the first three months, the performance dropped dramatically as evidenced by a drop in energy savings to about 0.5%. In addition, after three months in service some delamination of the coating surface from the underlying substrate was observed. After three years of such operation, the coating shown in FIGS. 5A-5C had an SiC content of about 22% on a dry basis. Based on this amount it is estimated that the coating composition as originally applied to the furnace walls contained about 30% to 40% SiC on a dry basis. In FIGS. 5A-5C, the coating is beginning to or has delaminated from the underlying substrate due to the poor adhesion and thermal properties of the commercially available coating. Without being bound to a theory, it is believed that the drop in performance as evidenced by the delamination of the coating in FIGS. 5A-5C is a result of the SiC content or the original coating being 30% or more on a dry basis.

The results indicate that coating compositions (A) and (B) containing less than 30% SiC on a dry basis promote and maintain good adhesion to silica insulating brick substrate and possess and maintain good thermal resistance under conditions simulating at least one service year of a naphtha cracking furnace. Unlike the commercially available coating composition illustrated in FIG. 4C, coating compositions (A) and (B) did not delaminate from their substrates after 8 simulated decoking cycles. Additionally, the results indicate that coating compositions in accordance with the present disclosure that include a $TiO_2$ weight percentage that falls within the $TiO_2$ weight percentage ranges spanning coating compositions (A) and (B), plus or minus a weight percentage variability of approximately 5% to 20% (e.g., about 10% to 15%) relative to the extremes of this range and less than 30% on a dry basis of SiC, can provide both enhanced emissivity and desirable substrate adhesion properties. For instance, coating compositions in accordance with the present disclosure having a wet admixture weight percentage of at least approximately 8% to 10% $TiO_2$; or a wet admixture weight percentage of less than approximately 22% to 23% $TiO_2$, or a wet admixture weight percentage between about 10% to 20% $TiO_2$; and an SiC content of less than 30% on a dry basis or even less than about 20% on a dry basis provide enhanced emissivity and desirable substrate adhesion properties. In representative coating composition embodiments in accordance with the present disclosure, as a $TiO_2$ weight percentage is varied from one particular coating composition to another, the weight percentage of a particular set of composition constituents (e.g., the weight percentage of $Al_2O_3$) can be adjusted accordingly, and the weight percentages of other composition constituents can remain constant.

One of ordinary skill in the art will understand that dry admixture weight percentages of the composition constituents given above can be calculated, e.g., by normalizing the specified wet weight percentages with respect to an overall 72% percent dry weight in view of the addition of 28% by weight aqueous solution containing $H_3PO_4$ into the mixing container.

The results reported in Examples 1-3 were surprising and/or unexpected. Such results indicate that $TiO_2$ can act as an emissivity enhancer in a thermal emissivity coating composition, and $TiO_2$ obtained from an industrial waste source or stream, for instance, associated with a polyolefin polymerization process, can be used to produce a coating composition having enhanced emissivity (e.g., an increase of 0.01 to 0.06 emissivity units or more) as well as adhesion to substrate properties that do not exhibit delamination over a substantial number of thermal cycles and/or a long period of time. Furthermore, in particular embodiments, a coating composition that provides both enhanced emissivity and substrate adhesion properties in accordance with embodiments described herein need not include more than approximately 30% SiC on a dry basis and 20% to 22% of $TiO_2$ (e.g., less than approximately 20% $TiO_2$), but at least about 8% to 10% $TiO_2$ to provide appropriate emissivity enhancement on a wet admixture basis. Correspondingly, a coating composition in accordance with particular embodiments of the disclosure need not include more than approximately 30% SiC on a dry basis and 27% to 30% TiO2 (for instance, less than approximately 27% to 29% (e.g., less than about 28%) $TiO_2$), but at least about 11% $TiO_2$ to provide appropriate emissivity enhancement on a dry admixture basis. In certain embodiments, a coating composition in accordance with embodiments of the disclosure can include less than 30% SiC on a dry basis and between approximately 8% to 16% $TiO_2$ on a wet admixture basis, or between approximately 11% to 22% $TiO_2$ on a dry admixture basis.

Representative examples of coating compositions provided by the present disclosure are described in Examples 4-6 below. It will be understood by a person of ordinary skill in the art that the scope of the present disclosure is not limited to the following compositions.

Example 4

A coating composition in the form of a slurry admixture was prepared in accordance with the present disclosure. The composition included approximately 22% by weight of aluminum oxide ($Al_2O_3$), approximately 18% by weight of silicon carbide (SiC), approximately 8% by weight of chromium oxide ($Cr_2O_3$), approximately 4% by weight of silicon dioxide ($SiO_2$), approximately 20% by weight of titanium dioxide ($TiO_2$), and approximately 28% by weight of water containing approximately 17% volume/volume of $H_3PO_4$. $TiO_2$ was selected from a commercial source, or a treated polyolefin catalyst waste stream as described in Example 2 above, or a mixture of the two sources. $TiO_2$ from commercial sources has higher purity than $TiO_2$ recovered from waste streams. For example, $TiO_2$ from commercial sources exhibits purities of more than 99%, while $TiO_2$ from waste sources has purity of 80% to 90% owing to the presence of $Al(OH)_3$ that can be converted to $Al_2O_3$ in accordance with embodiments described previously above.

The coating composition was formulated using the process 200 of FIG. 2.

The coating composition had a density of approximately 1.5-1.6 kg/liter, emissivity higher than approximately 0.97 at approximately 1000° C., emissivity (when measured in accordance with the description in Example 1) higher than approximately 0.85 at approximately 1200° C., and exhibited good surface adhesion to the coated substrate based on optical observations. The coating composition was applied directly to a substrate using a spray gun. Due to its improved emissivity and adhesion capability, a furnace including surfaces coated with the coating composition described in this example would have its fuel gas consumption desirably decreased by approximately 4% or approximately 100-200 kilograms of fuel gas/hour at a furnace throughput of approximately 30-32 tons/hour. The calculated decrease in fuel consumption is based on a cracking furnace with naphtha feed throughput of approximately 30-32 tons/hour and a normal fuel consumption of approximately 5 tons/hour of fuel gas. After applying the coating of this example, the fuel gas consumption of the furnace decreased by approximately 100-200 kilograms/hour or about 2% to 4%. This fuel gas saving remained constant after 10 iterations of a decoking cycle.

Example 5

A coating composition in the form of a dry admixture was prepared in accordance with the present disclosure. The composition included approximately 30.5% by weight of aluminum oxide ($Al_2O_3$), approximately 25.0% by weight of silicon carbide (SiC), approximately 11.1% by weight of chromium oxide ($Cr_2O_3$), approximately 5.6% by weight of silicon dioxide ($SiO_2$), and approximately 27.8% by weight of titanium dioxide ($TiO_2$). $TiO_2$ was selected from a commercial source, or a treated polyolefin catalyst waste stream as described in Example 2, or a mixture of commercial and waste sources. $TiO_2$ from commercial sources has higher purity than $TiO_2$ recovered from waste streams. For example, $TiO_2$ from commercial sources exhibits purities of more than 99%, while $TiO_2$ from waste sources has purity of 80% to 90% owing to the presence of $Al(OH)_3$ that can be converted to $Al_2O_3$ in accordance with embodiments described previously above.

The coating composition was prepared using process 200 of FIG. 2; however, process portion 240 was omitted. Ceramic precursors, namely $Al_2O_3$, SiC, $Cr_2O_3$, $SiO_2$, and emissivity enhancing $TiO_2$ from commercial sources, had an average particle size less than approximately 325-mesh, while $TiO_2$ from a polyolefin catalyst containing waste stream treated in accordance with Example 2 had an average particle size less than approximately 65-mesh.

The coating composition in the form of a dry admixture was prepared for ease of shipping and storage. Prior to coating a substrate, the dry coating admixture was thoroughly mixed with phosphoric acid at a concentration of 17% by volume in water in a controlled manner (e.g., depending upon a mixer configuration) to prevent powders or particles of ceramic precursors from clumping and attaching to the side of the mixing container.

The prepared coating was applied to insulating bricks forming the inner lining of a furnace. This furnace originally consumed approximately 1.25 ton/hour of fuel gas when operating at approximately 450° C. The coating had emissivity 0.98 when the coated furnace operated at 450° C. and this led to approximately 4% or 50 kg/hour of fuel gas consumption.

Example 6

A coating composition in the form of a slurry admixture was prepared in accordance with the present disclosure. The composition included approximately 2% by weight of aluminum oxide ($Al_2O_3$), approximately 18% by weight of silicon carbide (SiC), approximately 8% by weight of chromium oxide ($Cr_2O_3$), approximately 4% by weight of silicon dioxide ($SiO_2$), approximately 40% by weight of titanium dioxide ($TiO_2$), and approximately 28% by weight of water containing approximately 17% volume/volume of $H_3PO_4$. $TiO_2$ was selected from a commercial source, or a treated polyolefin catalyst waste stream as described in the foregoing, or a mixture of the two sources. $TiO_2$ from commercial sources has higher purity than $TiO_2$ recovered from waste streams. For example, TiO2 from commercial sources exhibit purities of more than 99%, while $TiO_2$ from waste sources has purity of 80-90% owing to the presence of $Al(OH)_3$ that can be converted to $Al_2O_3$ in accordance with embodiments described previously above.

The coating composition was prepared using process 200 in accordance with FIG. 2.

The coating composition had a density of approximately 1.5-1.6 kg/liter, emissivity higher than approximately 0.98 at approximately 1000° C., emissivity (measured in accordance with Example 1) higher than approximately 0.86 at approximately 1200° C., and possessed very good surface adhesion to the coated substrate. The coating composition was applied directly to an insulating brick substrate using a spray gun as described above in Example 1. The coating composition contributed at least approximately 20% heat loss reduction in a furnace when applied to exposed surfaces. The 20% reduction in heat loss was based on determining the temperature of the outside surface of the furnace before and after applying the coating composition and applying conventional heat transfer principles to calculate the difference in heat loss due to conduction through the furnace wall and convection at the furnace wall surface at the ambient conditions (e.g., room temperature and wind speed).

Example 7

To assess the adhesion and cohesion properties of high emissivity coatings having the compositions set forth in Table 3 below to an insulating brick substrate, a scratch-test method (ASTM C1624-05 (10)) was conducted on compositions 1, 2, and 3. Generally, a scratch test method consists of the generation of scratches with a sphero-conical stylus including a Rockwell C diamond tip or hard metal tip having a cone angle of 120° and a tip radius of 200 μm by drawing the stylus at a constant speed across a coating-substrate system to be tested. As the stylus is drawn across the coating substrate system, either a constant or progressive loading at a fixed rate is applied to the substrate by the stylus. For progressive loading, the critical load (Lc) is defined as the smallest load at which a recognizable failure occurs.

The driving forces for coating damage in the scratch test are a combination of elastic-plastic indentation stresses, frictional stresses and residual internal stresses. In a lower load regime, these stresses result in conformal or tensile cracking of the coating which still remains fully adherent to the substrate. The onset of these stresses defines a first critical load. In a higher load regime, another critical load is defined and corresponds to the onset of coating detachment from the substrate by spalling, buckling or chipping.

In this example, three scratches were performed on each sample using a CSM Instruments SA Revetest Scratch Tester (RST). The RST is suited to test adhesion/cohesion strength of hard coatings on soft substrates as well as soft coatings on hard substrates. A hard metal tip having a cone angle of 120° was used to perform the measurements. The test conditions and parameters are listed in Table 3. After the measurements, each sample was cleaned with a duster spray and the distance between the point of initial contact between the stylus and the location where delamination of the coating from the substrate occurred was measured. Using the force applied/distance curve, the load corresponding to the location where delamination occurred was determined. The load when the delamination occurred for each sample is reported in Table 4 below.

Each coating composition was prepared using the technique described in Example 1 above. Each sample was prepared by applying the wet coating composition to an insulating brick substrate as described in Example 3. Prior to scratch testing, the coating was fired at 1200° C. for 5 hours. The fired coating was 200 micrometers thick.

TABLE 3

Scratch test conditions and parameters

| Test Conditions | |
|---|---|
| Test atmosphere | Air |
| Temperature | 24° C. |
| Humidity | 40% |
| Test Parameters | |
| Indenter | Hard metal tip (120°) |
| Loading type | Progressive |
| Scanning load | 0.9 N |
| Initial load | 0.9 N |
| Final load | 60 N |
| Loading rate | 38.2 N/min |
| Scratch length | 20 mm |
| Speed | 40 mm/min |

TABLE 4

Sample composition, coating properties, and loads at delamination

| | 1 | | 2 | | 3 | |
|---|---|---|---|---|---|---|
| Coating composition (Bold is wet mixture/ Italics is dry mixture) | | | | | | |
| Calcined alumina | 21 | 29.2 | 16 | 22.2 | 11 | 15.3 |
| Silicon carbide | 9 | 12.5 | 14 | 19.4 | 19 | 26.4 |
| Chromic oxide | 6 | 8.3 | 6 | 8.3 | 6 | 8.3 |
| Quartzite | 3 | 4.2 | 3 | 4.2 | 3 | 4.2 |
| Titania | 18 | 25.0 | 18 | 25.0 | 18 | 25.0 |
| Phosphoric acid | 15 | 20.8 | 15 | 20.8 | 15 | 20.8 |
| Water | 28 | 0 | 28 | 0 | 28 | 0 |
| Total | 100 | 100 | 100 | 100 | 100 | 100 |
| Coating information | | | | | | |
| Substrate: Insulating brick | | HI 28 | | HI 28 | | HI 28 |
| Coating thickness (μm) | | 200 | | 200 | | 200 |
| Firing temperature (° C.) | | 1,200 | | 1,200 | | 1,200 |
| Firing time (hr) | | 5 | | 5 | | 5 |
| Load at Delamination (N) | | | | | | |
| 1 | | 21.4 | | 38.8 | | 28.7 |
| 2 | | 23.7 | | 37.6 | | 31.4 |
| 3 | | 22.1 | | 37.5 | | 27.1 |
| Average | | 22.4 | | 38.0 | | 29.1 |
| Standard deviation | | 1.0 | | 0.6 | | 1.8 |

The results reported in Table 4 indicate that the sample compositions delaminated from the substrate at loads ranging from 21.4 N to 38.8 N. These results are a representation of the adhesion of the sample compositions to the insulating brick substrate.

Additional Aspects of Coating Composition Formulation, Preparation, or Selection In accordance with some embodiments of the disclosure, a target emissivity level for a coating composition under consideration, or a measure of emissivity enhancement for a set or group of coating compositions, can be determined or estimated by referencing or accessing data that specifies a manner in which varying a $TiO_2$ concentration (e.g., on a wet or dry admixture weight percentage basis) relative to the concentrations of one or more other coating composition constituents (e.g., a filler such as $Al_2O_3$) affects or can be expected to affect emissivity. Such data can be stored in an electronic format (e.g., in a table or database) or non-electronic format. Additionally, such data can also include or specify a manner in which varying a $TiO_2$ concentration (e.g., on a relative basis with respect to a filler) can be expected to affect coating composition adhesion to one or more types of substrates across a predetermined period of time, for instance, a significant or long period of time such as at least 6 months, approximately 1 year, or more than 1 year. Based upon such data, a coating composition that provides enhanced emissivity as a result of the inclusion of an appropriate amount of $TiO_2$, as well as desirable substrate adhesion properties across an appropriate time period, can be identified, selected, and readily prepared.

Particular embodiments of the disclosure are described above for addressing at least one of the previously indicated problems. While features, functions, processes, process portions, advantages, and alternatives associated with certain embodiments have been described within the context of those embodiments, other embodiments may also exhibit such advantages, and not all embodiments need necessarily exhibit such advantages to fall within the scope of the disclosure. It will be appreciated that several of the above-disclosed features, functions, processes, process portions, advantages, and alternatives thereof, may be desirably combined into other different methods, processes, systems, or applications. The above-disclosed features, functions, processes, process portions, or alternatives thereof, as well as various presently unforeseen or unanticipated alternatives, modifications, variations or improvements thereto that may be subsequently made by one of ordinary skill in the art, are encompassed by the following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A thermal emissivity coating composition comprising: a dry admixture of a set of emissivity agents including titanium dioxide, wherein a weight percentage of the titanium dioxide is less than approximately 20% by weight of the coating composition and at least approximately 10% by weight of the coating composition; and at least one matrix strength enhancer selected from the group consisting of silicon carbide, hafnium diboride, hafnium carbide, hafnium nitride, tantalum diboride, tantalum carbide, tantalum nitride, titanium diboride, titanium carbide, titanium nitride, zirconium diboride, zirconium carbide, and zirconium nitride.

2. The thermal emissivity coating composition of claim 1, wherein the coating composition includes at least approximately 10% by weight of titanium dioxide and an increased emissivity value at a temperature range of between approximately 400° C. and 1300° C.

3. The thermal emissivity coating composition of claim 1, wherein the emissivity value of the coating composition at a temperature of approximately 1000° C. increases as the percentage by weight of titanium dioxide in the coating composition increases.

4. The thermal emissivity coating composition of claim 1, wherein the set of emissivity agents includes in addition to titanium dioxide at least one emissivity agent selected from the group consisting of silicon carbide, chromium oxide, silicon dioxide, iron oxide, boron silicide, boron carbide, silicon tetraboride, molybdenum disilicide, tungsten disilicide, and zirconium diboride.

5. The thermal emissivity coating composition of claim 1, further comprising at least one filler selected from the group consisting of aluminum oxide, silicon dioxide, magnesium oxide, calcium oxide, and boron oxide.

6. The thermal emissivity coating composition of claim 1, further comprising about 2.08% to about 85.71% by weight on a dry basis filler selected from aluminum oxide, silicon dioxide, magnesium oxide, calcium oxide and boron oxide.

7. The thermal emissivity coating composition of claim 1 wherein the set of matrix strength enhancers includes SiC in an amount ranging between about 8% to less than 30% on a dry weight basis.

8. The thermal emissivity coating composition of claim 1, further comprising on a dry basis about 8% to about 20% SiC on a weight basis.

9. A thermal emissivity coating composition comprising:
a dry admixture of a set of emissivity agents including titanium dioxide and at least one emissivity agent selected from the group consisting of silicon carbide, chromium oxide, silicon dioxide, iron oxide, boron silicide, boron carbide, silicon tetraboride, molybdenum disilicide, tungsten disilicide, and zirconium diboride, wherein a weight percentage of the titanium dioxide is less than approximately 20% by weight of the coating composition and at least approximately 10% by weight of the coating composition; and a set of matrix strength enhancers selected from at least one matrix strength enhance chosen from ceramic borides, ceramic carbides and ceramic nitrides.

10. The thermal emissivity coating composition of claim 9, wherein the coating composition includes at least approximately 10% by weight of titanium dioxide and an increased emissivity value at a temperature range of between approximately 400° C. and 1300° C.

11. The thermal emissivity coating composition of claim 9, wherein the emissivity value of the coating composition at a temperature of approximately 1000° C. increases as the percentage by weight of titanium dioxide in the coating composition increases.

12. The thermal emissivity coating composition of claim 9, wherein the set of matrix strength enhancers includes at least one matrix strength enhancer selected from the group consisting of silicon carbide, hafnium diboride, hafnium carbide, hafnium nitride, tantalum diboride, tantalum carbide, tantalum nitride, titanium diboride, titanium carbide, titanium nitride, zirconium diboride, zirconium carbide, and zirconium nitride.

13. The thermal emissivity coating composition of claim 9, further comprising at least one filler selected from the group consisting of aluminum oxide, silicon dioxide, magnesium oxide, calcium oxide, and boron oxide.

14. The thermal emissivity coating composition of claim 9, further comprising about 2.08% to about 85.71% by weight on a dry basis, filler selected from aluminum oxide, silicon dioxide, magnesium oxide, calcium oxide and boron oxide.

15. The thermal emissivity coating composition of claim 9 wherein the set of matrix strength enhancers includes SiC in an amount ranging between about 8% to less than 30% on a dry weight basis.

16. The thermal emissivity coating composition of claim 15, comprising on a dry basis about 8% to about 20% SiC on a weight basis.

* * * * *